Patented Aug. 27, 1929.

1,725,801

UNITED STATES PATENT OFFICE.

ELAM G. HESS, OF MANHEIM, PENNSYLVANIA, ASSIGNOR TO PECANO MANUFACTURING COMPANY, A CORPORATION OF DELAWARE.

METHOD OF MAKING FOOD PRODUCTS FROM NUT KERNELS.

No Drawing.   Application filed December 15, 1928.   Serial No. 326,417.

The invention relates to an improved method of making a food product from nut kernels. The object is to produce a product from nut kernels which shall retain the flavor of the nut unimpaired and which shall also contain all the important elements of the nut, such as the protein fat or oil, the lime, iron, vitamins etc. contained in the nut kernel itself; which requires no mastication and which is easily assimilated by the digestive organs. The method is especially applicable to nuts having hard kernels, which must ordinarily be thoroughly masticated, in order that the same shall not be injurious to the digestive system.

The method consists in separating minute flake-like particles of uniform thickness from nut kernels, and causing said particles to fall through the atmosphere into a loose mass.

The method is effected, for example, by causing the nut kernels to come in contact with a moving foraminous surface and causing the resulting particles separated from the kernels to fall away by gravity from the body of the kernel, through the atmosphere into a loose, unconfined mass.

This separating and falling action is facilitated by producing unequal air pressure on the opposite sides of the foraminous surface. That is by producing a pressure above atmosphere upon one side of the foraminous surface, or a pressure below atmosphere on the opposite side of the foraminous surface, or both. This assures the separation of the small particles or shavings from the nuts without any agglomeration of the same.

What I claim is:—

1. The method of making a food product from nut kernels, which consists in separating minute flake-like particles of substantially uniform thickness from said kernels and causing said particles to fall through the atmosphere into a loose mass.

2. The method of making a food product from nut kernels, which consists in separating minute flake-like particles of substantially uniform thickness from said kernels and utilizing unequal air pressures on opposite sides of the region of separation of the particles from the nuts to cause said particles to fall through the atmosphere into a loose mass.

ELAM G. HESS.